3,124,601
ANTHRAQUINONE DYESTUFFS
Guido R. Genta, Pitcairn, Pa., assignor to American Aniline Products, Inc., a corporation of Maryland
No Drawing. Filed June 8, 1962, Ser. No. 200,915
5 Claims. (Cl. 260—347.7)

This invention relates to anthraquinone dyestuffs. In one specific aspect, it relates to new anthraquinone dyestuffs having a remarkable affinity for polyester fibers and which produce thereon red to yellowish-red shades. In another aspect, it relates to the dyeing of aromatic polyester fibers, e.g. polyethylene terephthalate or "Dacron," with anthraquinone compounds to produce dyeings having outstanding substantivity, light fastness and resistance to sublimation.

In recent years there has been a considerable effort expended in the dyestuff industry to find suitable materials for coloring the aromatic polyester fibers. These fibers, which have outstanding utility as textile materials, are made, for example, by heating a glycol of the formula: $HO(CH_2)_nOH$, wherein $n$ is an integer greater than one, but not exceeding 10, with isophthalic or terephthalic acid or with an ester forming derivative thereof, for example, an aliphatic or aryl ester of half ester, an acid halide or an amine salt, under conditions at which polycondensation is effected. Of these polyesters, polyethylene terephthalate or "Dacron" has made a remarkable impact on the textile industry.

Generally speaking, the aromatic polyester fibers have a poor affinity for dyestuffs and they do not readily absorb colorants from aqueous dispersions. As a result, considerable difficulty has been encountered in finding dyestuffs for e.g. polyethylene terephthalate which are acceptable in all of the important physical properties of substantivity, light fastness and resistance to sublimation. For example, certain of the known dyestuffs which have passable affinity for polyester fibers and which color these materials red shades having a reasonably satisfactory fastness to light, leave much to be desired with respect to their fastness to sublimation.

I have discovered a new class of anthraquinone dyestuffs which give outstanding overall performance when dyed on aromatic polyester fibers, particularly on polyethylene terephthalate. The affinity for the fiber, light fastness, and resistance to sublimation of my new anthraquinone compounds is quite remarkable when considered in the light of the performance of certain structurally similar materials. In U.S. Patent 2,773,071 there is disclosed a class of anthraquinone dyestuffs made by condensing 1-amino-2-halo-4-hydroxyanthraquinone with a phenol or substituted phenol. These dyestuffs produce on polyethylene terephthalate red dyeings characterized by a bluish cast. The fastness properties of the dyeings are acceptable, but their resistance to sublimation is somewhat limited. In U.S. Patent 2,972,622 there is disclosed a series of dyestuffs made by reacting a 1-amino-2-halo-4-hydroxyanthraquinone with an aromatic alcohol. These dyes also produce on polyethylene terephthalate red shades having a bluish cast.

The substantivity of my new dyestuffs is also quite remarkable when compared with that of the known red anthraquinone dyes. Surprisingly, my dyestuffs provide on polyethylene terephthalate a coloring which is approximately 50% greater in tinctorial strength. Furthermore, my new dyestuffs provide a color of yellowish-redness, a shade which is preferred over the bluish cast of the known red anthraquinone dyes. Unlike most dyestuffs which are suitable for coloring polyethylene terephthalate, my new dyestuffs have also remarkable affinity for nylon.

It is, therefore, an object of the present invention to provide a new class of yellowish-red colors for polyester and polyamide fibers.

In accordance with the invention, I have discovered a new class of anthraquinone dyestuffs having the formula:

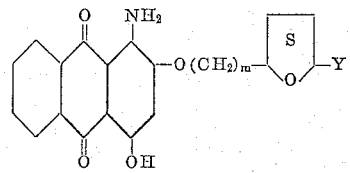

wherein $m$ is a small, whole number ranging from one to four, and Y is a member selected from the group consisting of hydrogen and $—(CH_2)_nOH$ wherein $n$ is a small, whole number ranging from one to four.

The dyestuffs are made using as one of the reactants, a 1-amino-2-halo-4-hydroxyanthraquinone or 1-amino-2-aryloxy-4-hydroxyanthraquinone, i.e. 1-amino-2-chloro-4-hydroxyanthraquinone, 1-amino-2-bromo-4-hydroxyantraquinone, 1-amino-2-phenoxy-4-hydroxyanthraquinone, and the like. The anthraquinone intermediate is reacted with an alkali metal salt of a mono- or di-alkanol of tetrahydrofuran, such as tetrahydrofurfuryl alcohol, 2,5-bis(hydroxymethyl)tetrahydrofuran, 2-(beta-hydroxyethyl)tetrahydrofuran, 2,5-bis(beta-hydroxyethyl)tetrahydrofuran, 2-(gamma-hydroxypropyl)-tetrahydrofuran, 2,5-bis(gamma-hydroxypropyl)tetrahydrofuran, and the like.

Conveniently the reaction is effected by mixing the anthraquinone intermediate with a substantial excess of the tetrahydrofuran alkanol. The tetrahydrofuran alkanol is converted to its alkali metal salt before reaction takes place. This is accomplished by heating the tetrahydrofuran alkanol to an elevated temperature, e.g., 140–190° C., in the presence of sodium or potassium hydroxide or carbonate in an amount sufficient to convert the hydroxy-lower alkyl group to the sodium or potassium salt thereof. The 1-amino-2-halo-(or -2-alkoxy)4-hydroxyanthraquinone is then added at a temperature ranging between 70 and 120° C. The mixture is heated to at least 125° C., preferably to 130–140° C., and held at that temperature until the reaction is complete, which generally requires 10–20 hours.

After the reaction is complete, an aqueous mineral acid or an organic acid, such as glacial acetic acid, previously diluted, is added dropwise to the mass to convert the reaction product to the alcohol. The product is recovered by filtration and it is washed with cold water until it is free of acid, inorganic materials and excess solvent.

The above procedure can be modified by running the reaction in an inert organic solvent rather than an excess of the tetrahydrofuran alkanol. In this case at least one mole of alkanol should be used, based on the weight of the anthraquinone intermediate. Suitable solvents include dioxane, ethylene glycol monomethyl ether, ethylene glycol monoethyl ether, diethylene glycol monoethyl ether, dimethylsulfoxide, dimethylformamide, and the like.

The dyestuff is applied to aromatic polyester fibers in the form of a dispersed color powder or paste which is obtained by wet milling, in a conventional apparatus such as a ball mill or Werner-Pfleiderer mill, the dye obtained as described hereabove with a dispersant such as sodium lignin sulfonate, and a wetting agent. The dispersed paste or cake thus obtained can also be dried at 70–80° C., and is thereafter micro-pulverized. Sufficient dispersant is added to give a dispersed powder containing generally between about 15–75% by weight active dyestuff base.

The dispersed powder, when added to water with or without auxiliary agents forms a near colloidal aqueous dispersion from which the aromatic polyester fiber or goods is dyed in the conventional manner to give a colored fiber containing about 0.01–2% by weight dyestuff.

In order to evaluate the effectiveness of a particular dyestuff for a given type of fiber, the dyed fiber is examined for substantivity of the color, light fastness of the color, and resistance of the color to sublimation.

Substantivity is a measure of affinity of the dyestuff for a particular fiber. In the trade, substantivity is evaluated in terms of "pile on"; in other words, the degree to which the depth of the dyeing is proportional to the amount of dye applied.

The light fastness of a dyed fiber is conveniently measured by accelerated laboratory testing methods involving exposure of the colored fabric to an artificial source of sunlight. The "Atlas Carbon Arc Fade-O-Meter Type FDAR," a commercially available apparatus for this purpose, is quite suitable for obtaining such measurements. The recommended testing procedure is Standard Test Method 16A–1957, which is described on page 107 of the Technical Manual of the American Association of textile Chemists and Colorists, 35 (1959). For colored aromatic polyester fibers, such as polyethylene terephthalate, an exposure time of from 20–40 hours in the "Fade-O-Meter" with little or no change in the color of the sample being tested shows that the light fastness of the sample is good for most purposes. Certain dyestuffs which are sold commercially for coloring polyethylene terephthalate show, when applied thereto, a break in color after only ten hours exposure. One of the astonishing features of the dyestuffs of the invention is their stability to light even at an exposure time of forty hours and higher.

Sublimation characteristics are determined generally according to Tentative Test Method 5–1957, which appears on page 100 of the Technical Manual of the American Association of Textile Chemists and Colorists, 35 (1959). That method, the so-called "dry-sublimation" technique, involves placing the dyed fabric between two undyed swatches and applying a hot iron thereto for a short period of time. Little or no transference of color to the undyed swatches indicates excellent resistance to sublimation. As we have noted, resistance to sublimation is one of the outstanding properties possessed by the dyestuffs of the invention when they are applied to an aromatic polyester fiber.

My invention is further illustrated by the following examples:

Example I

To a 500 ml. flask there were charged 200 ml. tetrahydrofurfuryl alcohol and 6 grams of potassium hydroxide flakes. The mass was heated to 165–180° C. and held for one hour at this temperature. After cooling to 100° C., there was added 26 grams 1-amino-2-phenoxy-4-hydroxyanthraquinone. The resulting mixture was heated to 125–130° C. and was held at this temperature for 18 hours. After cooling to 25° C., a solution containing 200 ml. water and 9 ml. glacial acetic acid was added dropwise to the mass. The final product was isolated by filtration. The cake was washed with water to remove inorganic materials and excess solvent.

The cake was ball-milled for 48 hours with 5 grams of sodium lignin sulfonate, available commercially as "Marasperce CB" and 5 grams wetting agent. The product was dried at 70–80° C. to give 24 grams (92% of theory) of 100% color.

Example II

The dyestuff of Example I was evaluated as a color for polyethylene terephthalate as follows:

A colloidal solution of the disperse color of Example I was made by dissolving one gram of standardized disperse color in a medium containing 25 ml. of 10% "Igepon T" (described by its manufacturer as $$C_{17}H_{22}CON(CH_2)C_2H_4SO_3Na)$$

and 475 ml. water at 90–95° C.

The dye bath was prepared as follows: To a stainless steel vessel was charged 190 ml. of 70° C. water. There was then added 5 ml. of a 1% "Igepon T" solution and 5 ml. of 10% strength modified self-emulsifiable solvent carrier. To the bath there was slowly added with stirring 50 ml. of the previously prepared colloidal solution of dispersed color. Several 5 gram skeins of polyethylene terephthalate were added to the bath and the fibers were turned in the dye bath. The temperature of each bath was raised to 95° C. over a period of 15 minutes and held thereat for one hour. The skeins of the polyethylene terephthalate were then removed and scoured in 1 liter of 95° C. water containing soap and detergent. After ten minutes of scouring the skeins were removed and washed with hot water. They were then oven dried at 80–90° C.

The samples of polyethylene terephthalate were visually evaluated for color value and tested for light fastness and sublimation according to the standard AATCC tests referred to hereabove. Light fastness was measured using an "Atlas Carbon Arc Fade-O-Meter-Type FDAR" according to Standard Test Method 16A–1957. Observations were made at 20 hour intervals for a break caused by the fading of the color. One "Fade-O-Meter" hour represents approximately five days of exposure to sunlight. A definite break in the color before 20 hours exposure time is considered poor. A slight break at 20 hours is rated as fair and a break between 20 and 60 hours shows that the light fastness is good for most purposes. If the sample withstands more than 60 hours exposure without a break in the color, the light fastness is considered to be excellent. The product of Example I was characterized by excellent light fastness.

Fastness to sublimation was determined generally according to Tentative Test Method 5–1957 of the AATCC. A piece of dyed polyethylene terephthalate cloth was placed between a piece of undyed polyethylene terephthalate and a piece of undyed acetate rayon cloth. The cloth was then rolled up and stapled together. It was then wrapped in a paper towel and placed in a steamer for 15 minutes at 15 lbs. pressure. After removal from the steamer, the sample goods was placed between two pieces of cotton cloth and ironed. Observation was then made of the color which is found upon the acetate rayon and undyed polyethylene terephthalate. An excellent sublimation is one in which both undyed cloths remain completely free of color. The dyestuff of Example I had excellent sublimation properties.

Example III

To a 500 ml. flask there were charged 150 ml. tetrahydrofurfuryl alcohol, 13 grams of potassium carbonate and 20 grams of 1-amino-2-bromo-4-hydroxyanthraquinone. The resulting mixture was slowly heated to 120° C. and held at this temperature for 16 hours. After cooling to approximately room temperature, the mass was neutralized with dilute acetic acid and the precipitated dyestuff was isolated by filtration and dried.

The dried cake was dispersed as described in Example I. Dyeings made from this product were very similar to those obtained in Example I.

Example IV

To a 500 ml. flask there were charged 200 ml. tetrahydrofurandimethanol [2,5 - bis(hydroxymethyl)tetrahydrofuran] and 6 grams potassium hydroxide flakes, the potassium salt being formed by heating the mass to 165–170° C. for one hour. After cooling to 25° C., there was added 26 grams 1-amino-2-phenoxy-4-hydroxyanthraquinone. The resulting mixture was heated to 125–130°

C. for 16 hours. After cooling to 25° C. and neutralizing with dilute acetic acid, the dyestuff was isolated and dried. 24 grams of 100% color were obtained. When dispersed as described in Example I, the dyestuff showed excellent properties.

*Example V*

The tetrahydrofurandimethanol used as a starting material in Example IV was replaced by the bis-hydroxyethyl derivative. A dyestuff was obtained which provided equally good properties on Dacron and nylon.

I claim:
1. A compound of the formula:

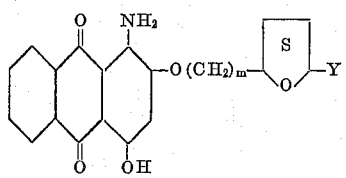

wherein $m$ is an integer having a value of one to four, and Y is a member selected from the group consisting of hydrogen and —$(CH_2)_nOH$, wherein $n$ is an integer having a value of one to four.

2. A compound of the formula:

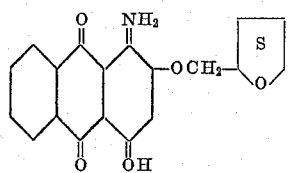

3. A compound of the formula:

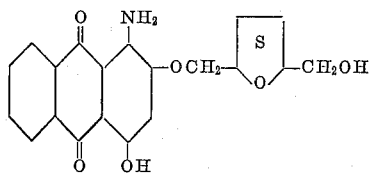

4. A compound of the formula:

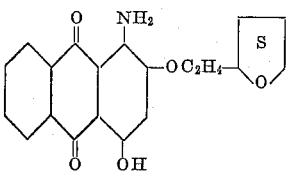

5. A compound of the formula:

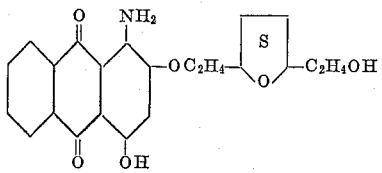

References Cited in the file of this patent
UNITED STATES PATENTS

| | | |
|---|---|---|
| 2,326,047 | McNally et al. | Aug. 3, 1943 |
| 2,922,691 | Grossman | Jan. 26, 1960 |
| 2,944,870 | Atkinson et al. | July 12, 1960 |
| 3,024,252 | Eugster et al. | Mar. 6, 1962 |
| 3,055,914 | Garber et al. | Sept. 25, 1962 |